(12) United States Patent (10) Patent No.: US 7,940,694 B2
Pusateri (45) Date of Patent: May 10, 2011

(54) INTELLIGENT FILTERING OF REDUNDANT DATA STREAMS WITHIN COMPUTER NETWORKS

(75) Inventor: Thomas J. Pusateri, Wake Forest, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 805 days.

(21) Appl. No.: 11/273,009

(22) Filed: Nov. 14, 2005

(65) Prior Publication Data

US 2008/0002723 A1 Jan. 3, 2008

(51) Int. Cl.
*H04L 12/56* (2006.01)
(52) U.S. Cl. ........ 370/254; 370/400; 709/223; 725/105; 725/119; 725/149
(58) Field of Classification Search ................... 370/401, 370/216; 709/201, 203
See application file for complete search history.

(56) References Cited

U.S. PATENT DOCUMENTS

| | | | | | |
|---|---|---|---|---|---|
| 5,473,599 | A | * | 12/1995 | Li et al. | 370/219 |
| 6,570,851 | B1 | * | 5/2003 | Koskelainen et al. | 370/231 |
| 6,888,831 | B1 | * | 5/2005 | Hospodor et al. | 370/394 |
| 6,928,477 | B1 | * | 8/2005 | Leymann et al. | 709/226 |
| 7,006,431 | B1 | * | 2/2006 | Kanekar et al. | 370/217 |
| 2002/0146016 | A1 | * | 10/2002 | Liu et al. | 370/401 |
| 2002/0198840 | A1 | * | 12/2002 | Banka et al. | 705/50 |
| 2003/0145077 | A1 | * | 7/2003 | Khan et al. | 709/224 |
| 2004/0199604 | A1 | * | 10/2004 | Dobbins et al. | 709/217 |
| 2006/0041698 | A1 | * | 2/2006 | Han et al. | 710/106 |

FOREIGN PATENT DOCUMENTS

| | | |
|---|---|---|
| CA | 2 499 283 A1 | 4/2004 |
| EP | 1 168 714 A2 | 1/2002 |
| EP | 1 198 157 A1 | 4/2002 |
| EP | 1 720 319 A1 | 11/2006 |

OTHER PUBLICATIONS

European Search Report dated Apr. 26, 2007, for corresponding European Application No. 06255809.3, 6 pgs.
Notification of Third Office Action dated Jun. 26, 2009 for corresponding Chinese Application No. 200610145718.5, 5 pgs.

* cited by examiner

*Primary Examiner* — Chirag G Shah
*Assistant Examiner* — Salvador E Rivas
(74) *Attorney, Agent, or Firm* — Shumaker & Sieffert, P.A.

(57) ABSTRACT

The principles of the invention allow an intermediate device, such as a router, to intelligently filter redundant data streams provided by one or more hosts. In the event of a network disturbance, the router may stop filtering one of the now needed redundant data streams in a manner that may reduce the consumption of network resources, such as bandwidth, without having to modify end-user applications residing on subscriber devices. Therefore, the router acting in accordance with the principles of the invention may transparently provide data streams to subscriber devices despite the occurrence of a network disturbance that may otherwise prevent the subscriber devices from receiving the data streams.

40 Claims, 5 Drawing Sheets

INTELLIGENT FILTERING OF REDUNDANT DATA STREAMS WITHIN COMPUTER NETWORKS

TECHNICAL FIELD

The invention relates to computer networks and, more particularly, to filtering of redundant data streams within a computer network.

BACKGROUND

Devices within a network distribute content and provide services to subscriber devices dispersed throughout the network. The devices, often referred to as hosts or host devices, may include web servers, application servers, digital content providers, file servers, print servers, or other devices. Examples of subscriber devices may include personal computers, laptops, workstations, personal digital assistants (PDAs), cellular phones, network ready appliances, wireless devices, set top boxes, and the like. In order to communicate the content and services between the hosts and subscriber devices, the network generally includes routing devices, often referred to as routers, that route the content and services from the host device, through the network, to the subscriber device. The network may also include hubs, gateways, switches, and other network devices to facilitate communications between the host devices and the subscriber devices.

Typically, a host authenticates the subscriber device so that the subscriber device may receive the content and services that the host provides. After authenticating the subscriber device, the host sends any content and services requested by the subscriber device through the network to the subscriber device. Conventional end-user applications executing on the subscriber devices receive and present the content and services to a user, and the user may interact with the end-user applications to request further content and services from the hosts. The host may, for example, provide content in the form of a data stream, such as a television broadcast feed from CNN or ESPN or an audio music stream, and the user may select one or more of the various data streams to view or listen to via the end-user applications.

Occasionally, a network disturbance, such as a network router failure, may interfere with communications between one of the hosts and the subscriber devices. In these instances, the network disturbance may prevent all or portions of the various data streams from reaching the subscriber devices, and, therefore, the users may not be able to access these data streams until the network disturbance is resolved. Conventional solutions to this problem involve utilizing multiple hosts to send redundant data streams to end-user applications. In some cases, upon detecting the failure within the network, the end-user application attempts to connect to another host device providing an identical, or redundant, data stream. Once connected, the end-user application may resume receiving the data stream and presenting the data stream to the user.

In other cases, one or more hosts provide one or more redundant data streams to the subscriber device in parallel with the original data stream. In this case, the end-user application need not connect to a different host in the event of a network failure. Instead, the end-user application need only select one of the redundant data streams that are unaffected by the network failure.

While these solutions may reduce the impact of a network failure on the delivery of content and servers, the conventional solutions may substantially increase the consumption of bandwidth throughout the network. For example, delivery of one or more redundant data streams to each subscriber device may consume considerable bandwidth even though a network disturbance has not occurred. Moreover, these solutions require that each end-user application be modified to become aware of and be able to process the redundant data streams.

SUMMARY

In general, the principles of the invention allow an intermediate device, such as a router, to intelligently filter redundant data streams provided by one or more hosts. In the event of a network disturbance, the router may stop filtering one of the now needed redundant data streams in a manner that may reduce the consumption of network resources, such as bandwidth, without having to modify end-user applications residing on subscriber devices. Therefore, the router acting in accordance with the principles of the invention may transparently provide data streams to subscriber devices despite the occurrence of a network disturbance that may otherwise prevent the subscriber devices from receiving the data streams.

For example, techniques are described for receiving with the intermediate device a plurality of redundant data streams from multiple hosts destined for a subscriber device and filtering at least one of the plurality of redundant data streams with the intermediate device. In particular, the intermediate device may select a master host from the multiple hosts and filter at least one of the plurality of redundant data streams based on the selection of the master host. In the event of a network disturbance that prevents the subscriber device from receiving data streams, the intermediate device cooperates with other intermediate devices to select a new master host from the multiple hosts and begins forwarding one of the redundant data stream received from the new master host to the subscriber device. In this manner, the intermediate device may intelligently filter redundant data streams in a manner that is transparent to the end-user applications residing on the subscriber device. Moreover, because the intermediate device may filter redundant data streams prior to forwarding the redundant data streams through a network, the intermediate device may limit the consumption of network resources throughout the network.

In one embodiment, a method comprises receiving with an intermediate device one or more of a plurality of redundant data streams provided by multiple sources and destined for a destination device, and filtering at least one of the plurality of redundant data streams with the intermediate device.

In another embodiment, an intermediate device comprises one or more interface cards to receive one or more of a plurality of redundant data streams output by multiple sources and destined for a destination device, and a control unit to filter at least one of the plurality of redundant data streams.

In another embodiment, a computer-readable medium comprise instructions for causing a programmable processor to: receive one or more of a plurality of redundant data streams provided by multiple sources and destined for a destination device, and filter at least one of the plurality of redundant data streams.

In another embodiment, a network system comprises a destination device, multiple sources that provide a plurality of redundant data streams destined for the destination device, and an intermediate device coupled between the destination device and at least one of the multiple sources to receive the plurality of redundant data streams from the multiple sources and filter at least one of the plurality of redundant data streams.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
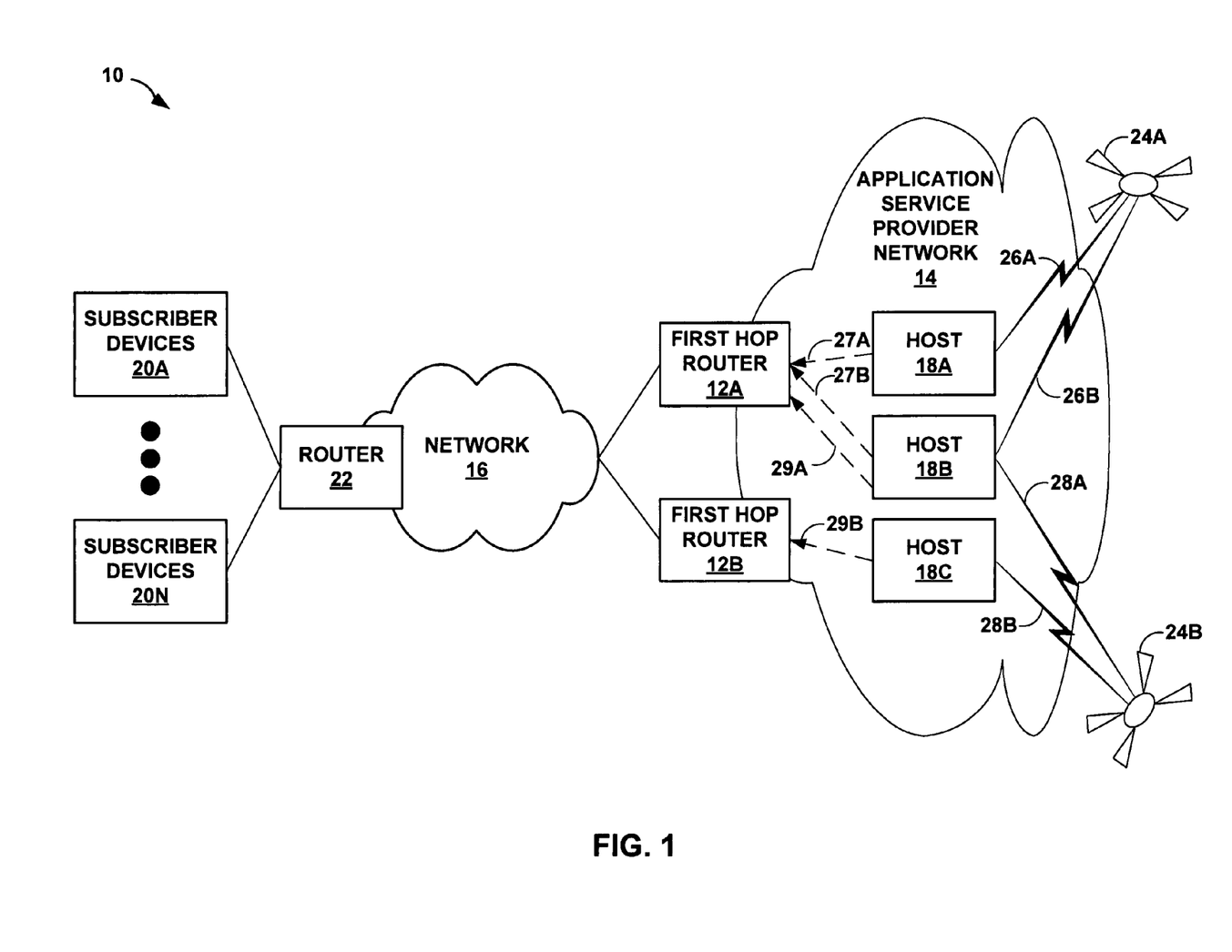
FIG. 1 is a block diagram illustrating an exemplary network system that intelligently filters redundant data streams.

FIG. 1 is a block diagram illustrating an exemplary network system 10 that intelligently filters redundant data streams. Although described in reference to multicast data streams for purposes of example, the principles of the invention may be applied to other types of data streams.

In this example, first hop routers 12A, 12B ("first hop routers 12") intelligently filter redundant data streams received from hosts 18A-18C ("hosts 18"). First hop routers 12 further link an application service provider network 14 to an intermediate network 16, and forward data streams from hosts 18 through intermediate network 16 to subscriber devices 20A-20N ("subscribers devices 20") via a router 22. Hosts 18 represent multiple sources capable of providing redundant data streams, and terms herein referring to "hosts," "host" information, and the like should be construed as exemplary sources, source information, and the like. Further, first hop routers 12 represent exemplary intermediate devices capable of filtering at least one of a plurality of redundant data streams and terms herein referring to "first hop routers" should be construed as exemplary intermediate devices. Other examples of intermediate devices include session border controllers, network acceleration devices, firewalls, virtual private network (VPN) devices, gateways, hubs, switches or other devices.

As illustrated in FIG. 1, application service provider network 14 comprises hosts 18 connected to first hop routers 12. Hosts 18A and 18B connect to first hop router 12A, and host 18C connects to first hop router 12B. Host 18A receives satellite feed 26A from satellite 24A, host 18B receives 26B, 28A from satellites 24A, 24B, respectively, and host 18C receives satellite feed 28B from satellite 24B. Hosts 18 may comprise satellite receivers to receive satellite feeds 26A, 26B, 28A, 28B from satellites 24A, 24B, which hosts 18 output as data streams 27A, 27B and 29A, 29B. Data streams 27A, 27B ("data streams 27") comprise substantially identical, or redundant, data streams and data streams 29A, 29B ("data streams 29") also comprise substantially identical, or redundant, data streams. Data streams 27, 29 may comprise video streams, such as a television broadcast feed from CNN or ESPN, or audio streams, such as streaming music feeds.

Intermediate network 16 represents any network through which data streams may flow and may include any of switches, hubs, gateways, servers, workstations, network printers, faxes, routers, and the like. As shown in FIG. 1, intermediate network 16 includes router 22 that connects subscriber devices 20 to intermediate network 16. Although not shown in FIG. 1, intermediate network 16 may comprise additional routers, hubs, or gateways to connect subscriber devices 20 to application service provider network 14. Subscriber devices 20 may comprise any device capable of accepting and presenting data streams, such as personal computers, laptops, personal digital assistants, cell phones, wireless devices, set top boxes, or other devices.

In the illustrated embodiment, first hop routers 12 intelligently filter redundant data streams received from hosts 18. First hop routers 12 receive redundant data streams 27, 29 from hosts 18 destined for subscriber devices 20, and filter at least one of each of redundant data streams 27, 29. First hop routers 12 may further exchange host information that describes hosts 18 so as to determine which of data streams 27, 29 to forward to subscriber devices 20. In accordance with the principles of the invention, first hop routers 12 may exchange this host information via a network protocol, such as an equivalent source redundancy protocol (ESRP) described herein. The network protocol may exchange host information that includes, for example, network addresses of a subset of hosts 18 that provide redundant data streams, a network address assigned to a first hop router of each host of this subset, a priority of each host of this subset, and stream sequence information. The network protocol may exchange further information, such as host load information, the number of active streams, and the bandwidth used by the streams, and the network protocol should not be limited as such.

Upon receiving the host information, first hop routers 12 update respective local host information stored within first hop routers 12 to reflect any changes in the network configuration relevant to first hop routers 12, such as the addition of hosts, content groups, first hop routers, and the like. Next, first hop routers 12 collectively select one or more master hosts from hosts 18 based on their respective local host information and forward one of each of data streams 27, 29 received from the master hosts. First hop routers 12 collectively filter data streams 27, 29 based on the selection of the master hosts.

In the event of a network disturbance, one or more of first hop routers 12 may detect the network disturbance by monitoring communications between each of first hop routers 12. Common network disturbances may include a failure of one of first hop routers 12 or a failure in the communication links or interfaces between first hop routers 12. In any case, the network disturbance may affect the transmission of one or more of data streams 27, 29 to subscriber devices 20. For example, failure of host 18A results in the failure of delivery of data stream 27A. As another example, failure of host 18B results in failure of delivery of data streams 27B and 29A. Upon detection of a failure, the active first hop routers 12 may select new master hosts for each content group associated with hosts 18 based on their respective local host information. Upon selecting one or more new master hosts, the active first hop routers 12 forward one of each of data streams 27 and 29 received from these newly selected master hosts, through network 16 to subscriber devices 20.

In this manner, first hop routers 12 cooperate to intelligently filter redundant data streams and may transparently manage redundant data streams 27, 29 based on the current status of first hop routers 12 and their network connectivity. In the event of an occurrence of a network disturbance, first hop routers 12 are able to forward one or more of data streams 27, 29 to subscriber devices 20 without any significant interruption. Moreover, because first hop routers 12 transparently filter the redundant data streams 27, 29, end-user applications residing on subscriber devices 20 do not require modifications so as to become aware of redundant data streams 27, 29. Further, the techniques do not needlessly waste the bandwidth of intermediate network 16 because first hop routers 12 filter the redundant data streams until needed, thereby preventing these filtered data streams from traveling across intermediate network 16.

Figure 2:
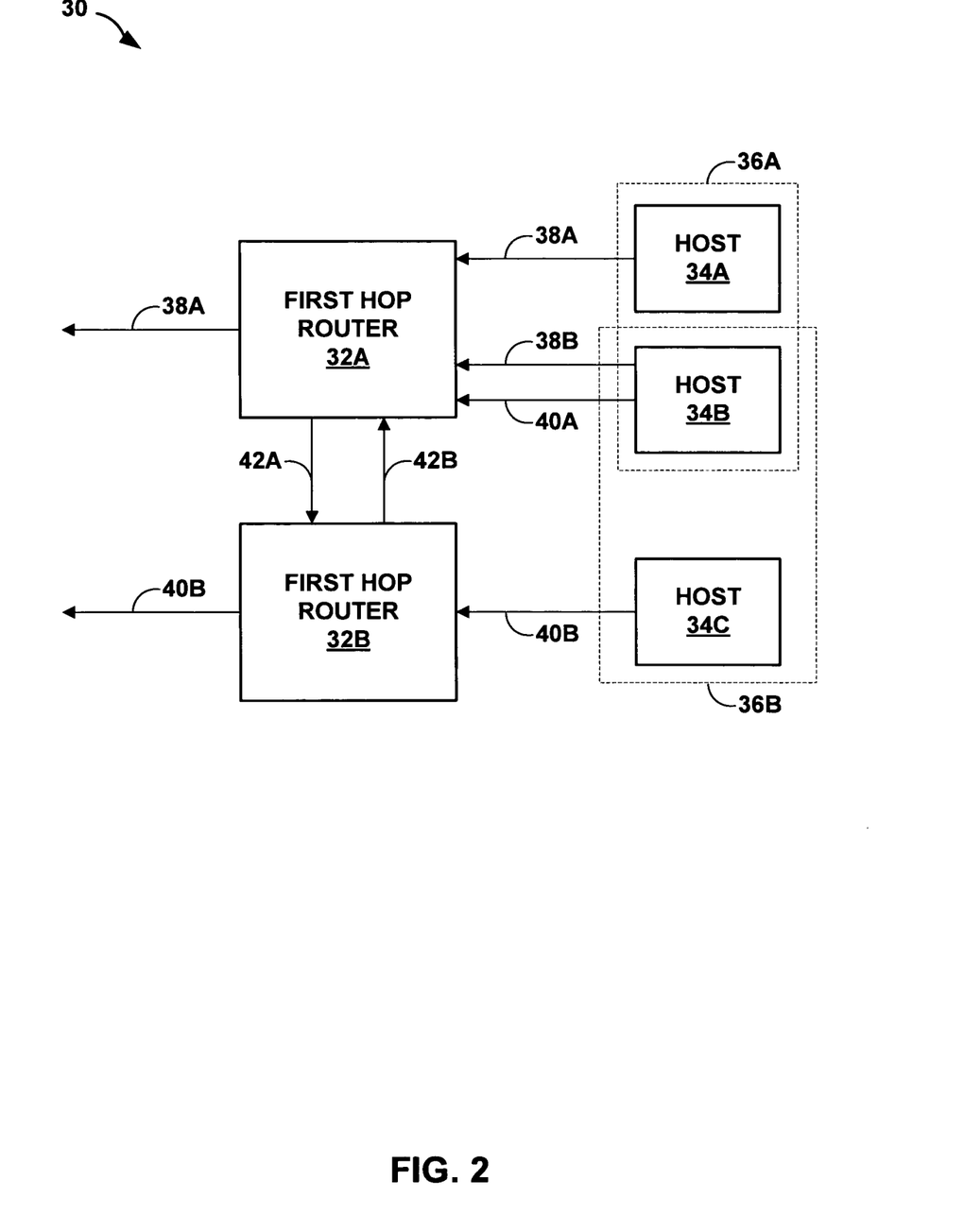
FIG. 2 is a block diagram illustrating an exemplary application service provider network that may be substantially similar to the application service provider network of FIG. 1.

FIG. 2 is a block diagram illustrating an exemplary application service provider network 30 that may be substantially similar to application service provider network 14 of FIG. 1. As shown in FIG. 2, application service provider network 30 comprises first hop routers 32A, 32B ("first hop routers 32") and hosts 34A-34C ("hosts 34"). First hop routers 32 may be coupled to hosts 34 via network links, over which, first hop routers 32 receive data streams 38A, 38B ("data stream 38") and data streams 40A, 40B ("data streams 40") from hosts 34. While FIG. 2 is described in reference to first hop routers 32, other intermediate devices that are not first hop routers may conform to the principles of the invention described herein to intelligently filter redundant data streams.

As shown in FIG. 2, application service provider network 30 may comprise content groups 36A, 36B ("content groups 36"), wherein content group 36A includes hosts 34A, 34B, and content group 36B includes hosts 34B, 34C. As used herein, content groups comprise a group of hosts that provide redundant data streams, such as hosts 34A, 34B, for the same content. For example, hosts 34A, 34B are equivalent sources for data streams 38. Similarly, hosts 34B, 34C are equivalent sources for data streams 40 and, therefore, are viewed by first hop routers 32 as content group 36B.

An administrator of application service provider network 30 may configure first hop routers 32 to recognize each of content groups 36. The administrator may also configure first hop routers 32 with election criteria, which first hop routers 32 may consult to determine which of hosts 34 of each of content groups 36 to select as master hosts. In one embodiment, the administrator configures first hop routers 32 in a full-mesh configuration, such that each of first hop routers 32 is aware of every other one of first hop routers 32. In other words, first hop router 32A, for example, knows of first hop router 32B, and first hop router 32B knows of first hop router 32A. In this manner, each of first hop routers 32 may exchange host information with every other router of first hop routers 32.

After the administrator configures each of first hop routers 32, first hop routers 32 may exchange host information via a novel equivalent source redundancy protocol (ESRP) described herein. In the illustrated embodiment, first hop router 32A, for example, transmits host information 42A to first hop router 32B, and first hop router 32B transmits host information 42B to first hop router 32A. Upon receiving each of host information 42A, 42B ("host information 42"), respective first hop routers 32 update local host information (not shown in FIG. 2) stored locally within each of first hop routers 32.

In some embodiments, host information 42 may include network addresses of a subset of hosts 34 that provide redundant data streams, a network address of a first hop router of each host of this subset, a priority of each host of this subset, and stream sequence information. For example, host information 42A may include the network addresses of hosts 34A, 34B that form content group 36A, the network address of first hop router 32A that serves as the first hop connection to hosts 34A, 34B, a priority number for each of hosts 34A, 34B, and stream sequence information. The priority number corresponding to each of hosts 34A, 34B indicates whether first hop router 32A, for example, has selected hosts 34A, 34B as master hosts. A priority number of zero may indicate that, upon receiving host information 42A, first hop router 32B should remove the host associated with the zero priority number from its local host information. The stream sequence information ensures that each of first hop routers 32 have not missed a message, thereby ensuring the full-mesh configuration and enabling each of first hop routers 32 to assess the status of every other one of first hop routers 32.

Upon exchanging host information 42 and updating their respective local host information, first hop routers 32 may select one of hosts 34 as a master host for each of content groups 36 based on their respective local host information and the election criteria. For example, first hop routers 32 may both select host 34A as the master host for content group 36A. Similarly, first hop routers 32 may both select host 34C as the master host for content group 36B. Generally, first hop routers 32 consult the pre-configured election criteria to determine which of hosts 34 to select as master hosts for each of content groups 36; however, in some embodiments, first hop routers 32 may dynamically determine which of hosts 34 to select as master hosts for each of content groups 36. The dynamic determination may depend upon current network conditions that first hop routers 32 may assess in real-time, such as host connection speed, downstream connection speed, available downstream bandwidth, and other network concerns.

After selecting master hosts for each of content groups 36, first hop routers 32 receive data streams 38, 40 from hosts 34. Data streams 38 comprise substantially identical, or redundant, data streams, and data streams 40 also comprise substantially identical, or redundant, data streams. Data streams 38, typically, provide different content than data streams 40. For example, data streams 38 may provide a broadcast television feed from CNN, and data streams 40 may provide a broadcast television feed from ESPN. First hop routers 32 receive data streams 38, 40 and intelligently filter one of redundant data streams 38 and one of redundant data streams 40 depending on which of hosts 34 were selected as master hosts.

In the above example, first hop routers 32 selected hosts 34A, 34C as master hosts. First hop routers 32 may determine that hosts 34A, 34C maintain master host status by accessing the associated priority numbers of hosts 34A, 34C stored within the local host information of each of first hop routers 32. Thus, first hop router 32A forwards data stream 38A and filters data streams 38B, 40B, and first hop router 32B forwards data stream 40B, as shown in FIG. 2. First hop routers 32 may transmit data streams 38A, 40B to another network, such as intermediate network 16 (FIG. 1), directly to subscriber devices, such as subscriber devices 20, or to any other common network, such as customer networks, local area networks, and the like.

While forwarding data streams 38A, 40B, each of first hop routers 32 may monitor the status of the other first hop routers 32 by transmitting "keep alive" or "hello" messages to every other one of first hop routers 32. In other embodiments, each of first hop routers 32 monitor the status of the other first hop routers 32 via one or more of routing protocol updates, link state, or network error messages, such as network unreachable messages. While discussed in the context of "keep alive" or "hello" messages for ease of illustration, the principles of the invention should not be limited to this method of detecting router status, and the principles of the invention may include the other methods discussed above.

The exchange of these "keep alive" or "hello" messages enables first hop routers 32 to detect the occurrence of a network disturbance. If, for example, first hop router 32A does not receive one of these messages from first hop router 32B within a set period of time, first hop router 32A may determine that a network disturbance has occurred which prevents first hop router 32B from forwarding data stream 40B.

After determining that a network disturbance has occurred, first hop routers 32 remove those of hosts 34 having the failed one of first hop routers 32 designated as their first hop router from the local host information, selecting one or more of the remaining hosts 34 stored in their respective local host information as master hosts according to the election criteria, and forwarding data streams originating from these new master hosts. In the above example where first hop router 32B fails to communicate a "keep alive" or "hello" message, first hop router 32A may remove host 34C from its local host information, select host 34B as the master host for content group 36B after electing a new master, and begin forwarding both of data streams 38A, 40A, while filtering data stream 38B, all within a manner that is transparent to the end-user application residing on subscriber device 20 (shown in FIG. 1).

Accordingly, first hop router 32B may fail to communicate a "keep alive" or "hello" message for a variety of reasons. In one instance, first hop router 32B may fail entirely and may terminate all routing functions. In this instance, first hop router 32B may not forward data stream 40B until the administrator resolves the issue that caused first hop router 32B to fail. In other instances, the connection between first hop routers 32 may fail, however, first hop router 32B may, in this instance, also fail to receive a "keep alive" or "hello" message from first hop router 32A. Thus, first hop router 32B may continue to forward data stream 40B, however, first hop router 32B, upon detecting the network failure, may perform the steps discussed above to remove those of hosts 34 having first hop router 32A designated as their first hop router from the local host information stored on first hop router 32B. In this manner, first hop routers 32 transparently provide one of each of data streams 38 and data streams 40 to subscriber devices without any significant interruption, even though a network disturbance may occur to disrupt the forwarding of one or more of redundant data streams 38, 40.

Figure 3:
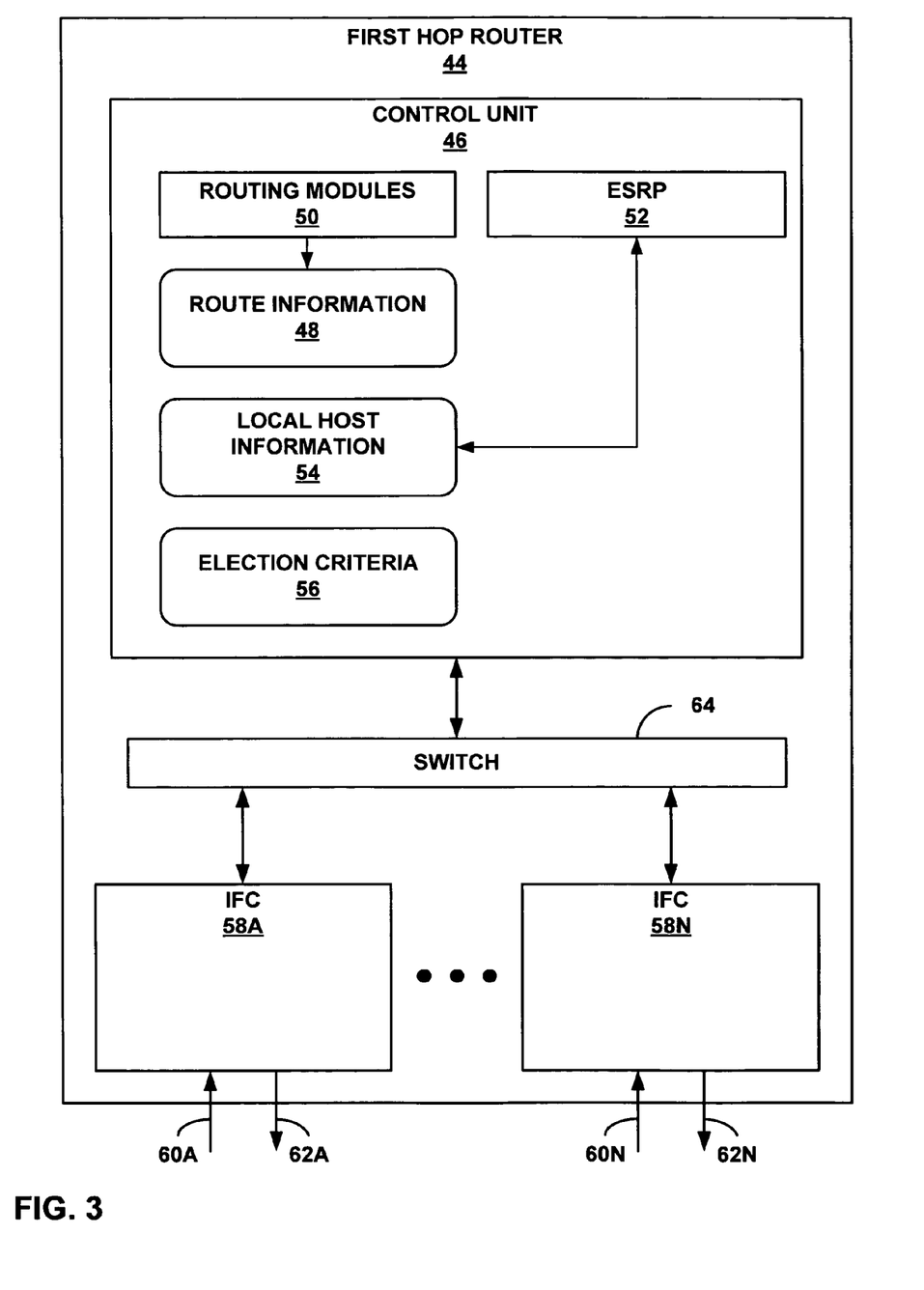
FIG. 3 is a block diagram illustrating an exemplary embodiment of a first hop router.

FIG. 3 is a block diagram illustrating an exemplary embodiment of a first hop router 44. First hop router 44 may be substantially similar to either one of first hop routers 32 of FIG. 2, and may perform the actions described above to intelligently filter redundant data streams consistent with the principles of the invention.

In the illustrated embodiment, router 44 includes a control unit 46 that maintains route information 48 to reflect the current topology of a network, e.g., application service provider network 30 and other network entities to which router 44 may be connected, e.g., intermediate network 16 of FIG. 1. Control unit 44 also comprises routing modules 50, a new equivalent source redundancy protocol 52 ("ESRP 52"), local host information 54, and election criteria 56. Routing modules 50 may maintain the necessary protocols to allow first hop router 44 to communicate with other entities residing within a network, as well as, the necessary logic to perform pertinent routing functions.

ESRP 52 provides a protocol for exchanging local host information 54 with other first hop routers connected via a full mesh configuration to first hop router 44. Local host information 54 maintains local information concerning hosts configured as content groups, such as hosts 34A, 34B configured as content groups 36A of FIG. 2, and may comprise network addresses of a subset of hosts 34 that provide redundant data streams, a network address assigned to a first hop router of each host of this subset, a priority number corresponding to each host of this subset, and stream sequence information.

Election criteria 56 may represent an ordered list for selecting master hosts for each content group connected to any of the first hop routers configured to communicate with first hop router 44, as well as, any content groups directly connected to first hop router 44.

First hop router 44 also includes interface cards (IFCs) 58A-58N ("IFCs 58") that receive data streams on inbound links 60A-60N ("inbound links 60") and transmit data streams on outbound links 62A-62N ("outbound links 62"). IFCs 58 are coupled to control unit 46 via a high-speed switch 64. In other embodiments, IFCs 58 may couple to control unit 46 via a high-speed router.

Initially, an administrator configures first hop router 44 to recognize content groups, such as content groups 36, by creating local host information 54 and election criteria 56 within control unit 46. The administrator also, typically, configures first hop router 44 to maintain a full-mesh configuration with other first hop routers, and may edit route information 48 to enable the full-mesh configuration. After configuring first hop router 44, the administrator may enable first hop router 44, and control unit 46 to exchange local host information 54 with other first hop routers in accordance with ESRP 52. Control unit 46 may exchange local host information 54 with the other first hop routers via switch 64 and IFCs 58.

During the exchange of host information, control unit 46 may receive host information from other first hop routers, and update local host information 54 with the received host information. If the received host information indicates that a host maintains a zero priority number, control unit 46 may remove that host from local host information 54. Next, control unit 46 consults election criteria 56 to determine which hosts control unit 46 needs to select as master hosts. Control unit 46 selects these hosts by setting the priority number associated with these hosts to the master host priority number within host information 56.

After selecting the master hosts, first hop router 44 may receive data streams from the hosts, such as hosts 34, via inbound links 60. Control unit 46 identifies the host of each data stream and determines which of these data streams to forward based on local host information 54. For example, host 34A may transmit data stream 38A to first hop router 44, and, upon receiving data stream 38A, control unit 46 may access local host information 54 to determine whether host 34A is selected as the master host for content group 36A. In particular, control unit 56 may determine whether the priority number associated with host 34A and stored in local host information 54 indicates that host 34A is the master host of content group 36A. If the priority number stored in local host information 54 indicates that host 34A is the master host, control unit 56 forwards data stream 38A via switch 64, one of IFCs 58, and an associated one of outbound links 62. However, if the priority number indicates that host 34A is not selected as the master host of content group 36A, control unit 46 does not forward data stream 38A but, instead, filters data stream 38A.

As described above, a network disturbance may arise to disrupt one or more of the first hop routers, such as first hop router 44, connected in the full-mesh configuration. First hop router 44 may routinely receive "keep alive" or "hello" messages from each of the other first hop routers connected to first hop router 44 via the full-mesh configuration. Control unit 46 of first hop router 44 may detect the network disturbance in the event that control unit 46 fails to receive these messages from any one of the other first hop routers connected to first hop router 44 via the full-mesh configuration. Upon failing to receive one of these messages from one of these other first hop routers, control unit 46 first identifies which one of these first hop routers failed to transmit the "keep alive" or "hello" messages. Once identified, control unit 46 removes any hosts information stored in local host information 54 having the failed first hop router identified as the host's first hop router from local host information 54. Next, control unit 46 consults election criteria 56 to determine which of the remaining hosts included within local host information 54 it should select as the master host. After promoting the new master hosts, control unit 46 forwards data streams originating from these new master hosts and filters any data streams originating from hosts not designated as master hosts, as described above.

While described in reference to control unit 46, first hop router 44 may comprise any device having a programmable processor or other hardware capable of executing instructions to carry out the functions described above. The programmable processor may replace control unit 46 or control unit 46 may include the programmable processor. First hop router 44 may store the instructions in a memory or other computer-readable medium (not shown in FIG. 3), such as a non-transitory computer-readable medium, or internally to control unit 46, in the event that control unit 46 includes the programmable processor. Regardless of whether first hop router 44 comprises a programmable processor, first hop router 44, in this manner, intelligently filters redundant data streams based on the current network condition of first hop routers connected to first hop router 44 via the full-mesh configuration. As such, end-user applications need not be modified to become aware of redundant data streams, which may, in turn, reduce the consumption of bandwidth across the network, as described above.

Figure 4:
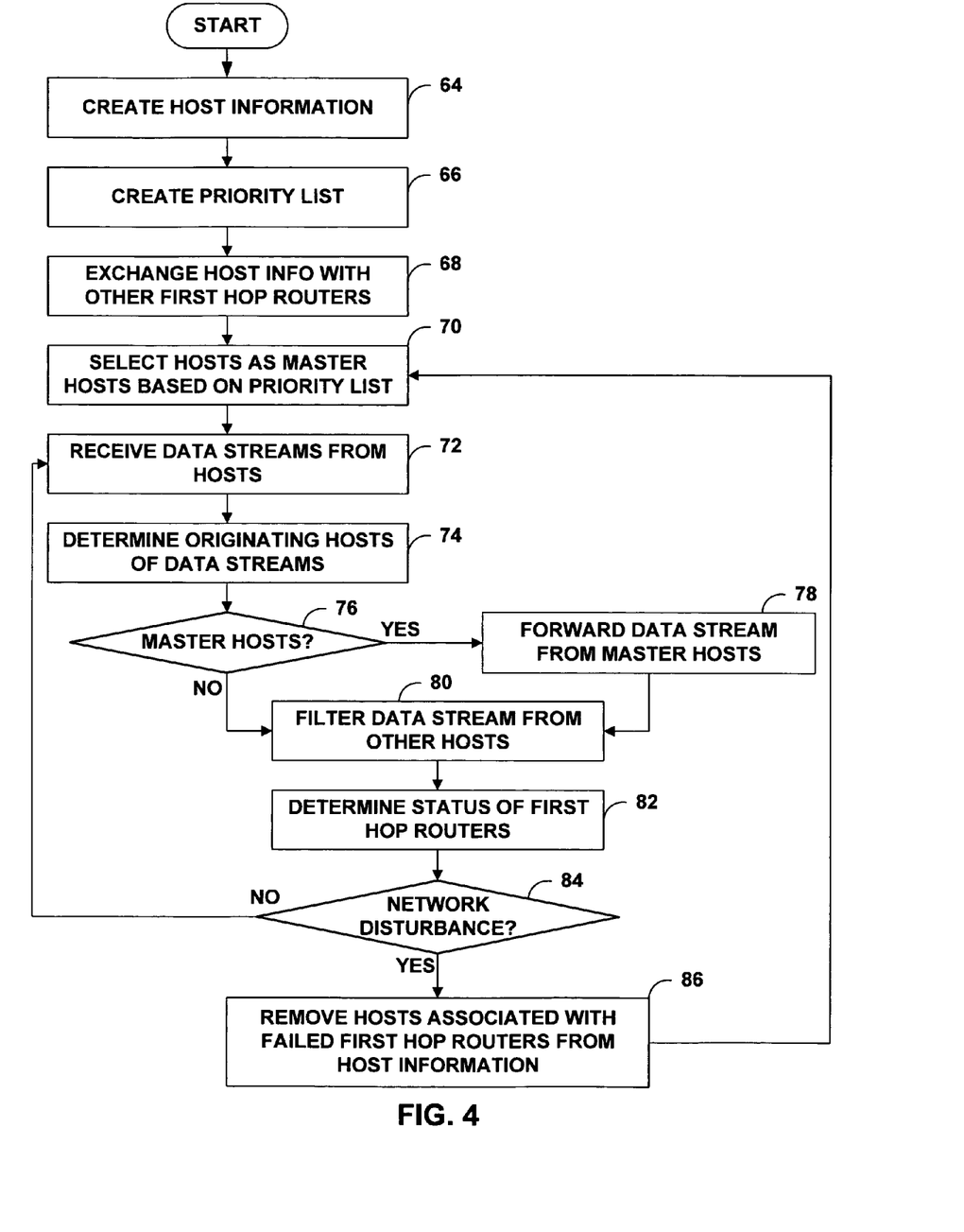
FIG. 4 is a flowchart illustrating an example operation of a first hop router in intelligently filtering redundant data streams.

FIG. 4 is a flowchart illustrating an example operation of a first hop router intelligently filtering redundant data streams. The operation is described in reference to first hop router 44 of FIG. 3; however, the principles of the invention may be applied to any intermediate device residing at any position within the network and should not be limited solely to first hop routers.

Initially, an administrator may configure first hop router 44 to recognize content groups, such as content groups 36 of FIG. 2, and select master hosts from those hosts included within each content group, such as hosts 34A, 34B included within content group 36A. In response to this configuration, control unit 46 of first hop router 44 creates local host information 54 and election criteria 56 (64, 66). Once configured, first hop router 44 exchanges local host information 54 with other first hop routers connected to first hop router 44 via a full-mesh configuration (68). As described above, control unit 46 updates local host information 54 with the host information received during the exchange and selects hosts included within local host information 54 as master hosts based on election criteria 56 (70).

Once control unit 56 finishes selecting the master hosts, first hop router 44 may receive data streams from hosts via inbound links 60 (72). Control unit 46 determines the originating host for each received data stream and accesses local host information 54 to determine whether the originating hosts of the data stream have been selected as master hosts (74, 76). In the event that first hop router 44 receives a data stream from a master host, control unit 46 forwards the data stream from the master host via outbound links 62 (78). However, in the event that first hop router 44 receives a data stream from a host not selected as a master host, control unit 46 instructs IFCs 58 to filter the data stream (80). Thus, first hop router 44 filters data streams received from non-master hosts, and forwards those data streams received from master hosts.

Throughout the course of forwarding and filtering data streams, first hop router 44 may determine the status of other first hop routers connected to first hop router 44 via the full-mesh configuration (82). Typically, as described above, first hop router 44 receives and transmits "keep alive" or "hello" messages to detect an occurrence of a network disturbance that may affect the transmission of data streams from the master hosts (84). In the event that no network disturbance has occurred, control unit 46 continues to receive data streams from hosts, forward those data streams originating from master hosts, and filter those data streams originating from hosts not designated as master hosts by control unit 46 ("NO" branch of 84).

However, in the event that first hop router 44 detects an occurrence of a network disturbance that prevents the communications with another first hop router connected to first hop router 44 via the full-mesh configuration, control unit 46 removes hosts information associated with the failed first hop router from local host information 54 (86). After removing the host information, control unit 46 selects one or more of those hosts remaining in local host information 54 as a master host based on election criteria 56 (70), and filters and forwards data streams according to these newly promoted master hosts, as described above. Thus, first hop router 44 may intelligently filter redundant data streams based on the current network conditions of the other first hop routers connected to first hop router 44 via the full-mesh configuration, and transparently provide data streams to subscriber devices despite the occurrence of a network disturbance.

Figure 5:
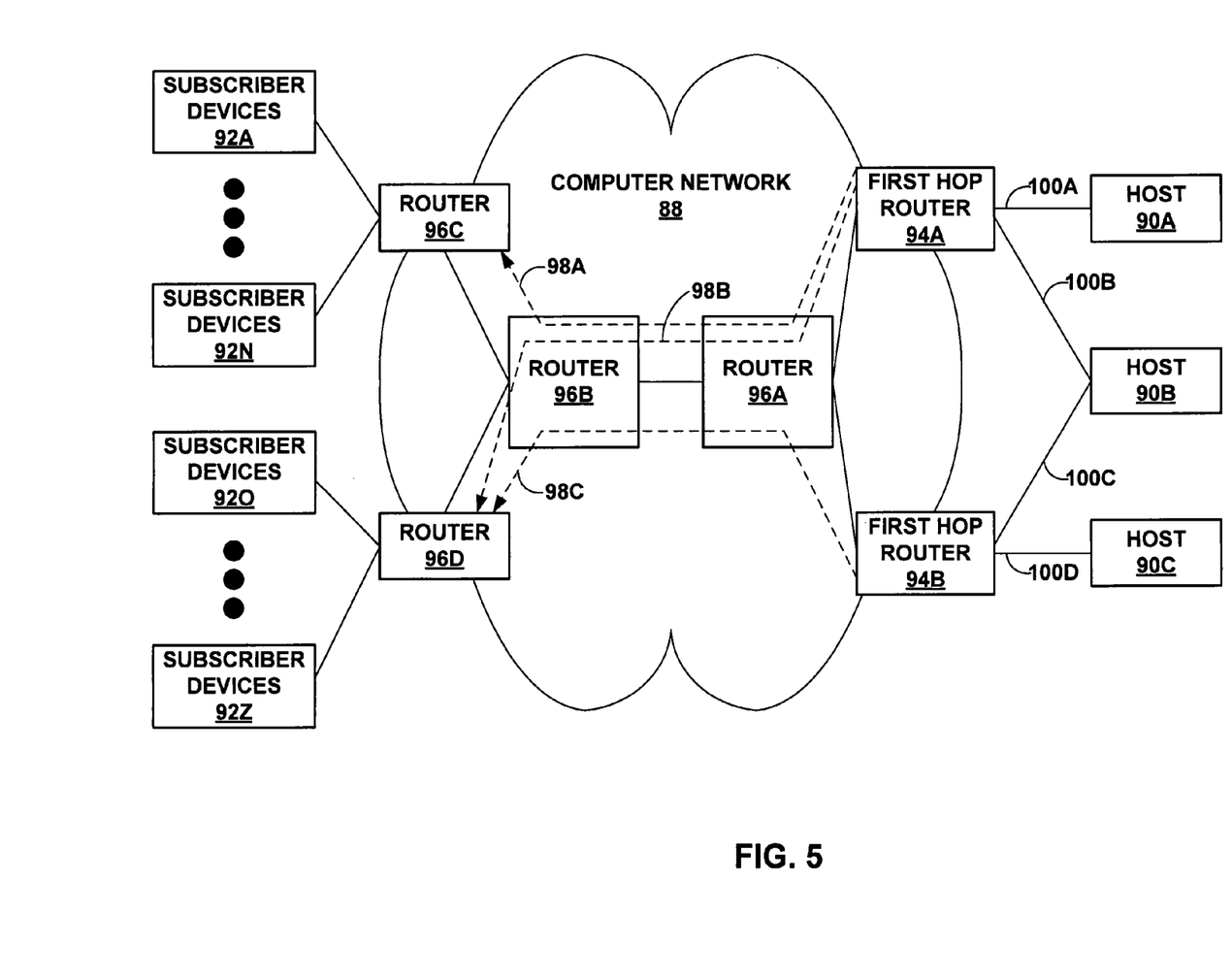
FIG. 5 is a block diagram illustrating an exemplary computer network that provides intelligent filtering of redundant data streams.

FIG. 5 is a block diagram illustrating another exemplary computer network 88 that provides intelligent filtering of redundant data streams. In this example, computer network 88 provides point to multi-point (P2 MP) connectivity between hosts 90A-90C ("hosts 90") and subscriber devices 92A-92Z ("subscriber devices 92") and may be substantially similar to application service provider network 14 of FIG. 1. Computer network 88 comprises first hop routers 94A-94B ("first hop routers 94") and routers 96A-96D ("routers 96"), all of which establish the P2 MP connectivity by establishing and managing exemplary label switch paths 98A-98C ("LSPs 98") via multi-protocol label switching (MPLS). By utilizing MPLS, first hop routers 94 can request paths through computer network 88, i.e., LSPs 98. Example MPLS protocols include the resource reservation protocol with traffic engineering (RSVP-TE) and the label distribution protocol (LDP).

As described above, an administrator may configure first hop routers 94 to create host information and election criteria and, also, to exchange their respective host information via an ESRP. Once configured, first hop routers 94 may promote one or more of hosts 90 to master hosts and receive data streams 100A-100D ("data streams 100") from respective hosts 90. Data stream 100A, 100B may comprise redundant data streams, and data streams 100C, 100D may also comprise redundant data streams.

Upon receiving data streams 100, first hop routers 94 may determine whether the originating hosts 90 of data streams 100 have been selected as master hosts, forward those of data streams 100 originating from master hosts, and filter those of data streams 100 originating from hosts 90 not selected as master hosts. In order to forward those of data streams 100 originating from master hosts, first hop routers 94 may request paths via MPLS, such as LSPs 98, and transmit these data streams 100 via one or more of LSPs 98.

In the event of an occurrence of an above described network disturbance, first hop routers 94 may detect the disturbance via the detection means discussed above. Once detected, first hop routers 94 may remove host information corresponding to the failed one of first hop routers 94 from their local host information, select new master hosts from those of hosts 90 remaining in their local host information, and begin forwarding those of data streams 100 originating from these newly promoted master hosts. In doing so, first hop routers 94 may request new LSPs (not shown in FIG. 5) via MPLS to establish a desired path. For example, first hop router 94A may fail, and first hop router 94B may select host 90B as the master host. First hop router 94B may determine that data stream 100C should forward to subscriber device 92A, however, no LSP exists to reach subscriber device 92A from first hop router 94B. Thus, first hop router 94B may request a new LSP via MPLS that routes data stream 100C through routers 96A, 96B, and 96C. After establishing the new LSP, first hop router 94B may forward data stream 100C to subscriber device 92A. Therefore, the principles of the invention, as described herein, may apply to computer networks, such as computer network 88, that provides P2 MP connectivity between hosts 90 and subscriber devices 92. Moreover, the invention should not be limited to any one computer network, and may apply to any network that provides for the transmission of redundant data streams.

In this manner, an intermediate device, such as router 44 of FIG. 4, acting in accordance with the principles of this invention may provide intelligent filtering of redundant data streams. Moreover, because the intermediate device manages the filtering of redundant data streams, end-user applications residing on subscriber devices need not be modified to become aware of redundant data streams. Further, by applying the principles of the invention to first hop routers, these first hop routers may filter the redundant data streams before they enter the network, and, therefore, the first hop routers may prevent significant consumption of network bandwidth. Although described herein in reference to first hop routers, the principles of the invention may apply to any intermediate network device at any location within the network, and should not be limited to first hop routers. Various embodiments of the invention have been described. These and other embodiments are within the scope of the following claims.

The invention claimed is:

1. A method comprising:
   communicating between a first intermediate device and a second intermediate device to select a master source from multiple sources, wherein each of the first intermediate device and the second intermediate device are coupled between a destination device and at least one of the multiple sources;
   receiving, with the first intermediate device, one or more of a plurality of redundant data streams provided by the multiple sources and destined for the destination device;
   based on the selected master source, filtering any of the plurality of redundant data streams received from the multiple sources not selected as the master source with the first intermediate device to prevent the filtered redundant data streams from traveling between the at least one of the multiple sources and the destination device; and
   with the second intermediate device, forwarding to the destination device a first one of the plurality of redundant data streams received from the master source without filtering the first one of the plurality of redundant data streams.

2. The method of claim 1, further comprising:
   receiving source information with the first intermediate device from the second intermediate device, wherein the source information specifies at least one of the multiple sources.

3. The method of claim 1, further comprising communicating with the second intermediate device to filter the plurality of redundant data streams except for one of the redundant data streams provided by the selected master source.

4. The method of claim 1, further comprising selecting the master source from the multiple sources based on election criteria.

5. The method of claim 2, wherein receiving the source information comprises receiving the source information with the first intermediate device from the second intermediate device via an equivalent source redundancy protocol.

6. The method of claim 2, wherein receiving the source information comprises receiving source information that includes network addresses of multiple sources connected to the second intermediate device, a network address of the second intermediate device, a priority number for each of the multiple sources connected to the second intermediate device, and stream sequence information.

7. The method of claim 4, wherein the master source is a first master source, and the method further comprising:
   detecting a network disturbance that prevents the second intermediate device from communicating with the first intermediate device;
   updating local source information to reflect the failure of the second intermediate device; and
   selecting a second master source from the multiple sources based on the local source information and the election criteria.

8. The method of claim 7, wherein filtering at least one of the plurality of redundant data streams comprises filtering at least one of the plurality of redundant data streams with the first intermediate device based on the selection of the second master source.

9. The method of claim 8, wherein filtering based on the selection of the second master source comprises:
   filtering at least one of the plurality of redundant data streams received from the multiple sources not selected as the second master source; and
   forwarding one of the plurality of redundant data streams received from the second master source.

10. The method of claim 9, wherein forwarding one of the plurality of redundant data streams received from the second master source comprises:
    establishing a label switch path via a multi-protocol label switching protocol; and
    forwarding the one of the plurality of redundant data streams received from the second master source via the label switch path.

11. The method of claim 7, wherein updating the local source information to reflect the failure of the second intermediate device comprises updating the local source information to remove source information associated with the second intermediate device.

12. An intermediate device comprising:
    one or more interface cards that receive one or more of a plurality of redundant data streams output by multiple sources and destined for a destination device; and
    a control unit that communicates with a second intermediate device to select a master source from multiple sources, wherein each of the first intermediate device and the second intermediate device are coupled between the destination device and at least one of the multiple sources,
    the control unit that filters any of the plurality of redundant data streams received from the multiple sources not selected as the master source to prevent the filtered redundant data streams from traveling between the at least one of the multiple sources and the destination device, wherein the intermediate device communicates with the second intermediate device to filter the plurality of redundant data streams except for one of the redundant data streams provided by the selected master source, such that the second intermediate device forwards to the destination device a first one of the plurality of redundant data streams received from the master source without filtering the first one of the plurality of redundant data streams.

13. The intermediate device of claim 12,
wherein the control unit receives source information from the second intermediate device, wherein the source information specifies at least one of the multiple sources.

14. The intermediate device of claim 12, wherein the intermediate device communicates with the second intermediate device to select the master source based on election criteria.

15. The intermediate device of claim 13, wherein the control unit receives the source information from the second intermediate device via an equivalent source redundancy protocol.

16. The intermediate device of claim 13, wherein the source information includes network addresses of multiple sources connected to the second intermediate device, a network address of the second intermediate device, a priority number for each of the multiple sources connected to the second intermediate device, and stream sequence information.

17. The intermediate device of claim 13, wherein the control unit instructs an interface card to filter at least one of the plurality of redundant data streams by instructing the interface card to filter at least one of the plurality of redundant data streams based on the selection of the master source.

18. The intermediate device of claim 17, wherein the control unit instructs the interface card to filter based on the selection of the master source by instructing the interface card to:
   filter at least one of the plurality of redundant data streams received from the multiple sources not selected as the master source; and
   forward one of the plurality of redundant data streams received from the master source.

19. The intermediate device of claim 14, wherein the master source is a first master source, and the control unit further detects a network disturbance that prevents the second intermediate device from communicating with the intermediate device, updates local source information to reflect the failure of the second intermediate device, and selects a second master source from the multiple sources based on the local source information and the election criteria.

20. The intermediate device of claim 19, wherein the control unit instructs the interface card to filter at least one of the plurality of redundant data streams by instructing the interface card to filter at least one of the plurality of redundant data streams based on the selection of the second master source.

21. The intermediate device of claim 20, wherein the control unit instructs the interface card to filter based on the selection of the second master source by instructing the interface card to:
   filter at least one of the plurality of redundant data streams received from the multiple sources not selected as the second master source; and
   forward one of the plurality of redundant data streams received from the second master source.

22. The intermediate device of claim 21, wherein the control unit instructs the interface card to forward one of the plurality of redundant data streams received from the second master source by instructing the interface card to:
   establish a label switch path via a multi-protocol label switching protocol; and
   forward the one of the plurality of redundant data streams received from the second master source via the label switch path.

23. The intermediate device of claim 19, wherein the control unit updates the local source information to reflect the failure of the second intermediate device by updating the local source information to remove source information associated with the second intermediate device.

24. The intermediate device of claim 12, wherein the intermediate device comprises a router that communicates with a second router to determine which one or more of the redundant data streams to filter.

25. The intermediate device of claim 12, wherein the intermediate device comprises a router, a session border controller, a switch, a gateway, a network acceleration device, a firewall or a virtual private network (VPN) device.

26. A non-transitory computer-readable medium comprising instructions for causing a programmable processor in an intermediate device coupled between a destination device and at least one of multiple sources to:
   communicate with a second intermediate device to select a master source from multiple sources, wherein each of the first intermediate device and the second intermediate device are coupled between the destination device and at least one of multiple sources;
   receive one or more of a plurality of redundant data streams provided by the multiple sources and destined for the destination device; and
   filter any of the plurality of redundant data streams received from the multiple sources not selected as the master source to prevent the filtered redundant data streams from traveling between the at least one of the multiple sources and the destination device; and
   communicate with the second intermediate device to filter the plurality of redundant data streams except for one of the redundant data streams provided by the selected master source, such that the second intermediate device forwards to the destination device a first one of the plurality of redundant data streams received from the master source without filtering the first one of the plurality of redundant data streams.

27. The non-transitory computer-readable medium of claim 26, wherein the instructions further cause the processor to:
   receive source information from a second intermediate device;
   update local source information stored on the first intermediate device with the received source information; and
   select the master source from the multiple sources based on the local source information and election criteria.

28. The non-transitory computer-readable medium of claim 27, wherein the instructions cause the processor to receive source information by receiving the source information from the second intermediate device via an equivalent source redundancy protocol.

29. The non-transitory computer-readable medium of claim 27, wherein the instructions cause the processor to filter at least one of the plurality of redundant data streams by filtering at least one of the plurality of redundant data streams with the first intermediate device based on the selection of the master source.

30. The non-transitory computer-readable medium of claim 27, wherein the master source is a first master source, and the instruction further cause the processor to:
- detect a network disturbance that prevents communication with the second intermediate device;
- update the local source information to reflect the failure of the second intermediate device; and
- select a second master source from the multiple sources based on the local source information and the election criteria.

31. The non-transitory computer-readable medium of claim 30, wherein the instructions cause the processor to filter at least one of the plurality of redundant data streams by filtering at least one of the plurality of redundant data streams based on the selection of the second master source.

32. A network system comprising:
- a destination device;
- multiple sources that provide a plurality of redundant data streams destined for the destination device; and
- a first intermediate device and a second intermediate device, each of the first intermediate device and second intermediate device coupled between the destination device and at least one of the multiple sources, the first and second intermediate devices configured to communicate to select a master source from the multiple sources, and receive the plurality of redundant data streams from the multiple sources,
- wherein the first intermediate device filters any of the plurality of redundant data streams received from the multiple sources not selected as the master source to prevent the filtered redundant data streams from traveling between the at least one of the multiple sources and the destination device, and
- wherein the second intermediate device forwards to the destination device a first one of the plurality of redundant data streams received from the master source without filtering the first one of the plurality of redundant data streams.

33. The network system of claim 32, wherein the second intermediate device provides source information to the first intermediate device,
- wherein the first intermediate device receives the source information from the second intermediate device, updates local source information stored on the first intermediate device with the received source information, and selects the master source from the multiple sources based on the local source information and election criteria.

34. The network system of claim 32,
- wherein the second intermediate device provides the source information to the first intermediate device via an equivalent source redundancy protocol, and
- wherein the first intermediate device receives the source information from the second intermediate device via the equivalent source redundancy protocol.

35. The network system of claim 33, wherein the master source is a first master source, and the first intermediate device further:
- detects a network disturbance that prevents the second intermediate device from communicating with the first intermediate device;
- updates the local source information to reflect the failure of the second intermediate device; and
- selects a second master source from the multiple sources based on the local source information and the election criteria.

36. The network system of claim 35, wherein the second intermediate device filters at least one of the plurality of redundant data streams by filtering at least one of the plurality of redundant data streams received from the multiple sources not selected as the second master source.

37. The network system of claim 36, wherein the first intermediate device filters based on the selection of the second master source by:
- forwarding one of the plurality of redundant data streams received from the second master source.

38. The network system of claim 37, wherein the first intermediate device forwards one of the plurality of redundant data streams received from the second master source by:
- establishing a label switch path via a multi-protocol label switching protocol; and
- forwarding the one of the plurality of redundant data streams received from the second master source via the label switch path.

39. The network system of claim 32, wherein the first intermediate device comprises a router that communicates with a second router to receive source information via a network protocol, wherein the source information specifies at least one of the sources.

40. The network system of claim 32, wherein the first intermediate device comprises a router, a session border controller, a switch, a gateway, a network acceleration device, a firewall or a virtual private network (VPN) device.

* * * * *